June 20, 1933.  E. RICARD ET AL  1,915,002
PROCESS OF OBTAINING FATTY ACIDS IN ANHYDROUS
STATE FROM AQUEOUS SOLUTIONS
Filed Dec. 14, 1929   2 Sheets-Sheet 2
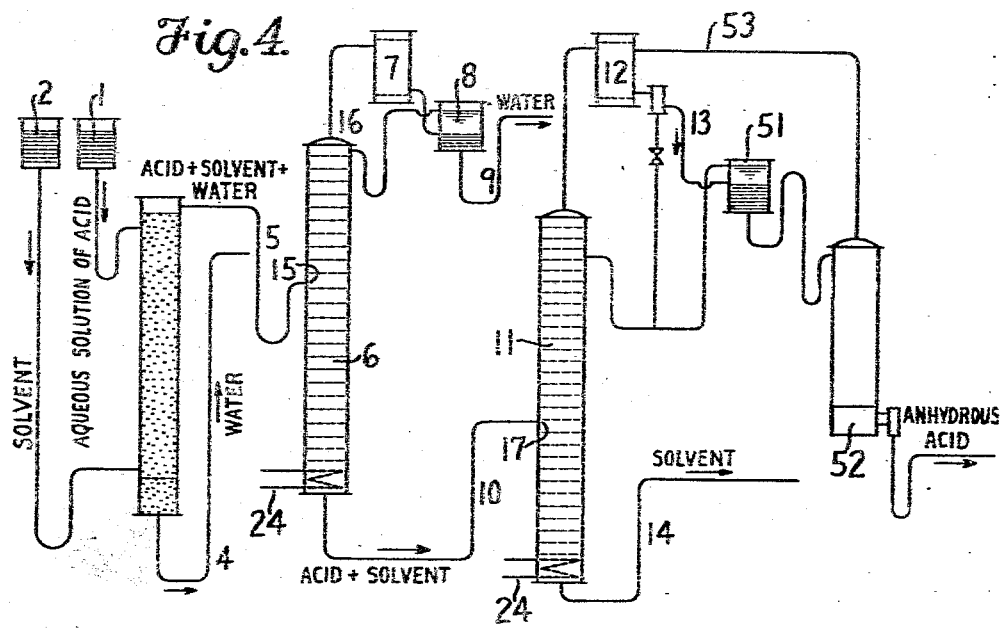
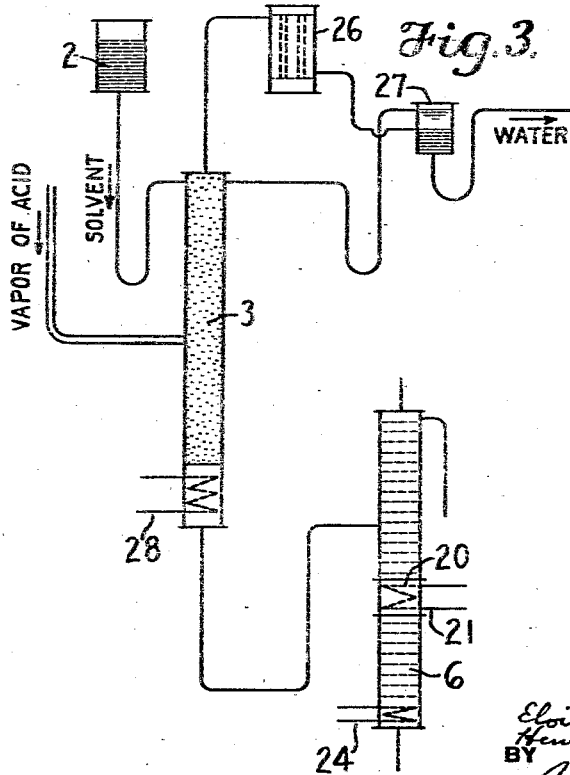

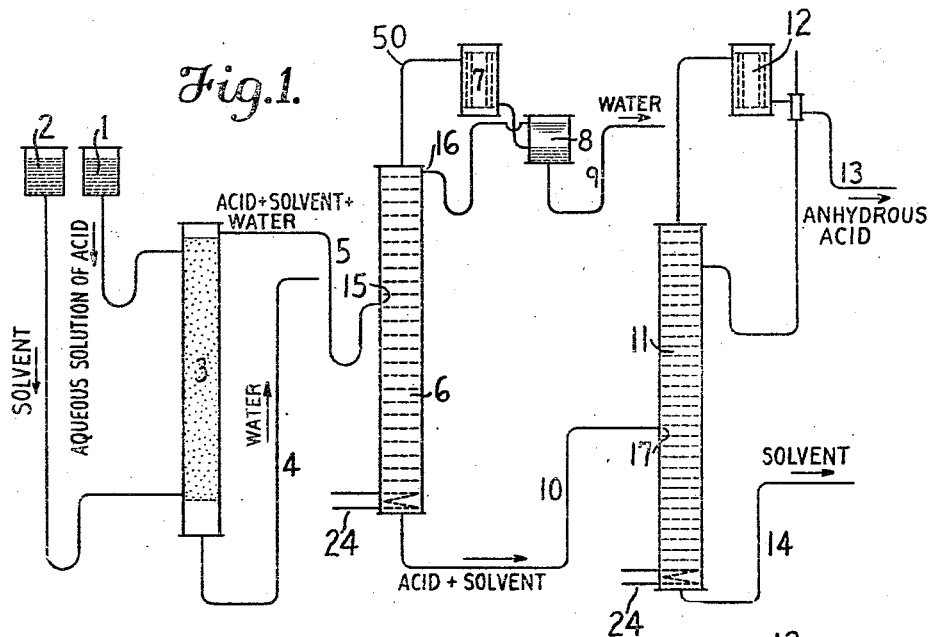
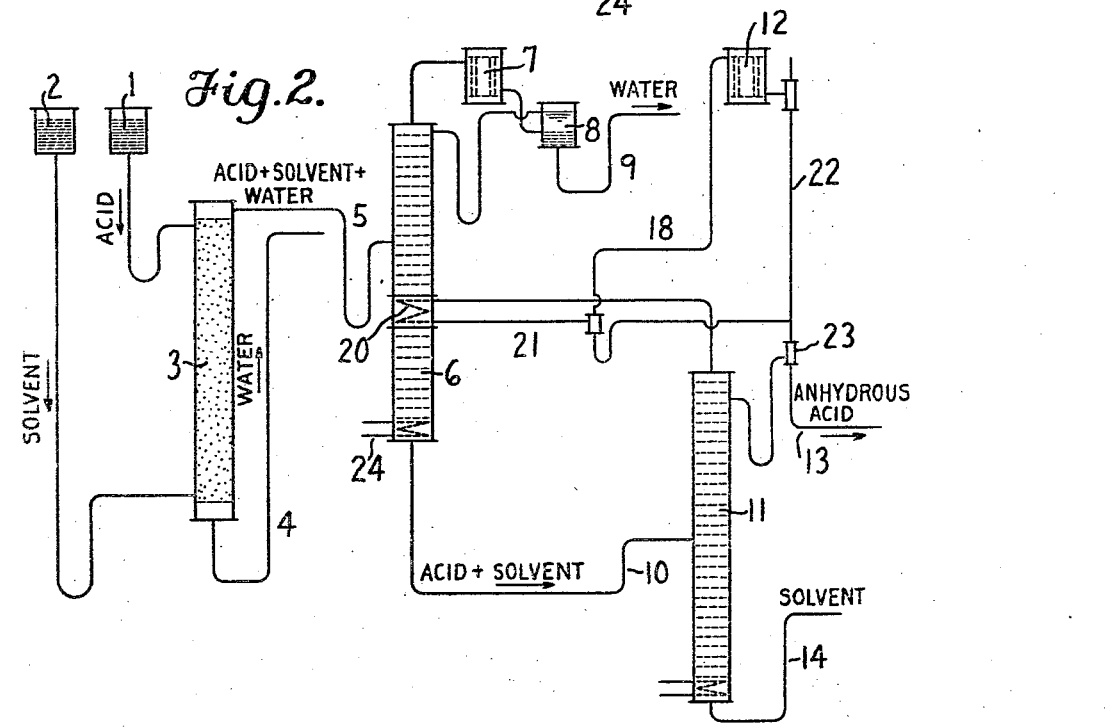

Patented June 20, 1933

1,915,002

UNITED STATES PATENT OFFICE

ELOI RICARD AND HENRI MARTIN GUINOT, OF MELLE, FRANCE, ASSIGNORS TO U. S. INDUSTRIAL ALCOHOL CO., OF NEW YORK, N. Y., A CORPORATION OF WEST VIRGINIA

PROCESS OF OBTAINING FATTY ACIDS IN ANHYDROUS STATE FROM AQUEOUS SOLUTIONS

Application filed December 14, 1929, Serial No. 414,239, and in France March 19, 1929.

In our Patents Nos. 1,839,894 and 1,839,932, dated January 5, 1932, we disclosed and claimed a method suitable for the dehydration of acetic acid.

Since then we have discovered that a method similar in its steps can be judiciously extended to water soluble acids of the fatty series in general. It is only necessary to carefully choose a suitable solvent and a suitable entraining body.

Generally stated, the acid is first extracted from its aqueous solution by an extraction solvent, and the extract, consisting of acid, solvent and a small proportion of water, is then dehydrated by distilling it in the presence of an auxiliary entraining liquid which forms a low minimum boiling point mixture with the water, so that the slight amount of water is removed, after which the acid can be economically recovered from the extraction solvent by a distillation, either azeotropic or ordinary.

The solvent is subject only to the conditions of being at most only slightly soluble in water, of having a boiling point higher than that of the corresponding acid, and of not forming an azeotropic mixture with said acid taken in anhydrous conditions.

The entraining body must yield with water a mixture having a minimum boiling point, said boiling point being lower than that of the mixture having a minimum boiling point formed by the solvent and water.

The method will be illustrated by the following example with reference to the appended drawings, in which Figs. 1 to 4 are diagrammatic illustrations of apparatus which may be employed.

Example 1

It will be assumed that the treatment is applied to an aqueous solution of propionic acid.

The acid solution which is contained in the recipient 1 and the solvent, for example, amyl propionate, boiling at 160° C., which is contained in the recipient 2, are circulated according to the counter-flow principle in an extraction column 3. From the bottom of the latter is removed water freed from acid through the pipe 4 while a mixture of propionic acid, amyl propionate and a small amount of water issues through the pipe 5 from the top of column 3. This mixture is fed at 15 into a dehydration still 6. This dehydration still is heated by surface means, for example, a steam coil 23, and is furnished with plates diagrammatically indicated by horizontal dotted lines.

The still plates have been charged with ethyl propionate, for example, as an auxiliary entraining body. Ethyl propionate forms with water an azeotropic mixture boiling at 80° C.

While distillation takes place in the dehydration still 6, the water in the mixture fed at 15 is carried off through the pipe 50 as an azeotropic mixture with ethyl propionate. The vapors forming said azeotropic mixture are condensed in the condenser 7 and the liquid resulting therefrom is delivered to a decanting vessel 8 wherein it is allowed to settle and to separate into two layers. The upper layer containing the ethyl propionate is sent back at 16 into the top of the still 6, while the lower layer composed of water is removed through the pipe 9.

From the bottom of the still 6 is withdrawn an anhydrous mixture of propionic acid and of amyl propionate, which mixture enters, at 17, the distilling apparatus 11, provided with surface heating such as a steam coil 24. While distilling, anhydrous propionic acid which has a lower boiling point than amyl propionate is carried off as vapors into the condenser. A part thereof is, in known manner, sent back into the column as a reflux, while the remainder flows out through the pipe 13. Amyl propionate is withdrawn from the bottom of the column 11 through the pipe 14, and the solvent thus recovered is used again indefinitely, after it has been cooled.

The amount of steam used in the still 6 may be reduced by heating it by the use of the heat available in the propionic acid vapors escaping from the distilling apparatus 11. The plant may be, to this effect, altered in the manner shown in Fig. 2. The propionic acid vapors issuing from the top of the distilling apparatus 11, instead of being delivered directly to the condenser 12, is passed into a surface heating device 20 placed in the still 6. The condensed propionic acid flows out through the pipe 21 together with propionic acid vapors which rise in the pipe 18 to the condenser 12. The propionic acid condensed in the condenser 22 together with the propionic acid from the pipe 21 is collected in the vessel 23 and a part thereof flows back as a reflux into the distilling apparatus 11, while the remainder is withdrawn through the pipe 13.

If necessary, the still 6 may be further heated at its bottom part, as indicated.

In certain cases (Fig. 3), we may alter the first step of the process, i. e. the extraction process, by causing the solvent from the tank 2 (in the particular example amyl propionate) to act in the extraction column 3 upon acid vapors.

The acid vapors (in the present example, the propionic acid vapors) having a large content in water (as steam) are sent into the middle part of the column 3 which is fed with solvent at the top. The solvent is brought to the boiling point and it rises with the steam to the top of the apparatus, producing a binary azeotropic mixture of water and mean solvent. This mixture settles in the decanting device 27, after condensation in the condenser 26. The bottom layer of liquid in the decanting apparatus is rejected, and the upper layer of mean solvent is constantly returned to the top of the extracting apparatus 3. As to the acid vapors these are dissolved in the mean solvent which constantly descends from the top of the apparatus, and are thus drained to the bottom. At this part, due to a small extra heating, at 28, there is drawn off at the bottom of the apparatus only a mixture of acid, mean solvent and a small amount of water. This mixture enters the apparatus 6, and we thus return to the general case, as above specified.

The used solvent issues from the bottom of apparatus 11 and is returned to the tank 2, as in the general case.

In certain cases the separation of the acid from the solvent may be somewhat difficult, and for this reason or for other reasons, in a way to make more efficient the manufacture of anhydrous acid, we use a modified plant as shown in Fig. 4.

As will be easily recognized, the plant is only modified as to the right part in the drawings; this part will only be described, assuming, as an example, that propionic acid is the acid treated and amyl propionate the solvent therefor.

In the distilling apparatus 11 is a mixture of anhydrous propionic acid and of amyl propionate.

In the distilling apparatus 11 we use a second auxiliary liquid, for instance an essence of petroleum of selected character boiling between very narrow limits of temperature, say between 138° C. and 140° C.

Said essence forms with the anhydrous propionic acid a mixture having a minimum boiling point containing 67% propionic acid and boiling at 134° C. The essence separates easily from the amyl propionate which acts as a tail product.

The column 11 is charged once for all with a suitable quantity of the said essence. In normal working, the column being heated under working pressure, there is recovered continuously from the bottom of the column 11, through the pipe 14, amyl propionate freed from acid, and at the top of said column rises an azeotropic mixture of anhydrous propionic acid and of essence which is condensed in the condenser 12. While a part of the condensate flows back as a reflux into the column 11, the remainder is fed into a decanting vessel 51, and allowed to settle therein.

In many instances, the condensate formed of anhydrous acid and solvent is homogeneous and is therefore unable to separate into two layers; in order to promote separation there is then added in the decanting vessel 51 or elsewhere (except in the column 11), an extremely small quantity of water, say 1 per cent.

The upper layer in the decanting vessel 51, formed chiefly of essence, is sent back into the column 11, together with the reflux, while the lower layer, formed of acid and a little amount of essence is forwarded to a small column 52 having heating surfaces; pure anhydrous acid as recovered from the bottom of the column 52 while the essence vapors rising to the top are turned to column 11 through the pipe 53.

*Example 2*

Let us assume that it is desired to treat a formic acid solution in the apparatus described with reference to Figs. 1, 2 and 3 in the foregoing example.

We may take as a solvent amyl formate boiling at 123.6° C. and as an entraining body propyl formate which forms with the water an azeotropic mixture boiling at 71.6° C.

If it is desired to apply the modification of Fig. 4, we may employ as a second auxiliary entraining liquid in the rectifying column 11 normal heptane boiling at 98.4° C. which forms with the anhydrous formic acid a mixture having a minimum boiling point containing 67% formic acid and boiling at 79.5° C.

*Example 3*

Dehydration of an aqueous solution of acrylic acid.

As a solvent is used butyrone (B. P. 144° C.). The extract solution of acrylic acid in butyrone, having a slight content of water is dehydrated by azeotropic distillation with ethyl acrylate (B. P. 98.3° C.).

Acrylic acid and butyrone having like boiling points (141° C. and 144° C., respectively), it would be impossible to separate these substances by ordinary distillation. In order to effect the separation, they are distilled according to the method described with reference to Fig. 4 in the presence of a mixture of hydrocarbons from petroleum, boiling between restricted temperature limits, for example, between 138° C. and 140° C. This hydrocarbon mixture forms with acrylic acid azeotropic mixture boiling at 133° C. and containing 68.2% acid. As a residue is recovered pure de-acidified butyrone, which is again used as a solvent.

What we claim is:—

1. A process for obtaining water soluble fatty acids in concentrated or anhydrous state from their aqueous solutions, which comprises treating such aqueous solutions with a solvent which is at most only slightly soluble in water and whose boiling point is higher than that of the acid and which does not form an azeotropic mixture with the anhydrous acid, then distilling the resulting extract in the presence of an auxiliary entraining liquid which gives an azeotropic mixture with water boiling at a temperature less than that of the mixture formed by the water and the extraction solvent, in such manner as to remove the water from the extract, and thereafter distilling the dehydrated extract so as to remove the acid from the solvent.

2. A process for obtaining water soluble fatty acids in concentrated or anhydrous state from their aqueous solutions, which comprises treating such aqueous solutions with a solvent which is at most only slightly soluble in water and whose boiling point is higher than that of the acid and which does not form an azeotropic mixture with the anhydrous acid, then distilling the resulting extract in the presence of an auxiliary entraining liquid which gives an azeotropic mixture with water boiling at a temperature less than that of the mixture formed by the water and the extraction solvent, in such manner as to remove the water from the extract, and thereafter distilling the dehydrated extract in the presence of a second entraining liquid which forms with the acid a binary mixture having a minimum boiling point.

3. A process for obtaining water soluble fatty acids in concentrated or anhydrous state from their aqueous solutions, which comprises treating such aqueous solutions with a solvent which is at most only slightly soluble in water and whose boiling point is higher than that of the acid and which does not form an azeotropic mixture with the anhydrous acid, then distilling the resulting extract in the presence of an auxiliary entraining liquid which gives an azeotropic mixture with water boiling at a temperature less than that of the mixture formed by the water and the extraction solvent, in such manner as to remove the water from the extract, and thereafter distilling the dehydrated extract in the presence of a second entraining liquid which forms with the acid a binary mixture having a minimum boiling point, drawing off the solvent, condensing said binary mixture and distilling it to separate the acid and the second entraining liquid.

4. A process for obtaining propionic acid in concentrated or anhydrous state from its aqueous solutions, which comprises treating such solutions with a solvent which is at most only slightly soluble in water and whose boiling point is higher than that of propionic acid and which does not form an azeotropic mixture with the anhydrous acid, then distilling the resulting extract in the presence of an auxiliary entraining liquid which gives an azeotropic mixture with water boiling at a temperature less than that of the mixture formed by the water and the extraction solvent, in such manner as to remove the water from the extract, and thereafter distilling the dehydrated extract so as to remove the propionic acid from the solvent.

5. A process for obtaining propionic acid in concentrated or anhydrous state from its aqueous solutions, which comprises treating such solutions with a solvent which is at most only slightly soluble in water and whose boiling point is higher than that of propionic acid and which does not form an azeotropic mixture with the anhydrous acid, then distilling the resulting extract in the presence of an auxiliary entraining liquid which gives an azeotropic mixture with water boiling at a temperature less than that of the mixture formed by the water and the extraction solvent, in such manner as to remove the water from the extract, and thereafter distilling the dehydrated extract in the presence of a second entraining liquid which forms with the propionic acid a binary mixture having a minimum boiling point.

6. A process for obtaining formic acid in concentrated or anhydrous state from its aqueous solutions, which comprises treating such solutions with a solvent which is at most only slightly soluble in water and whose boiling point is higher than that of formic acid and which does not form an azeotropic mixture with the anhydrous acid, then distilling the resulting extract in the presence of an auxiliary entraining liquid which gives an azeotropic mixture with water boiling at a temperature less than that of the mixture formed by the water and the extraction solvent, in such manner as to remove the water from the extract, and thereafter distilling the dehydrated extract so as to remove the formic acid from the solvent.

7. A process for obtaining formic acid in concentrated or anhydrous state from its aqueous solutions, which comprises treating such solutions with a solvent which is at most only slightly soluble in water and whose boiling point is higher than that of formic acid and which does not form an azeotropic mixture with the anhydrous acid, then distilling the resulting extract in the presence of an auxiliary entraining liquid which gives an azeotropic mixture with water boiling at a temperature less than that of the mixture formed by the water and the extraction solvent, in such manner as to remove the water from the extract, and thereafter distilling the dehydrated extract in the presence of a second entraining liquid which forms with the formic acid a binary mixture having a minimum boiling point.

8. A process for obtaining propionic acid in concentrated or anhydrous form from its aqueous solutions, which comprises treating such solutions with amyl propionate as a solvent to extract the propionic acid from the solution, then distilling the resulting extract in the presence of ethyl propionate as a water-entraining liquid for dehydration of the extract, and thereafter distilling the dehydrated extract so as to remove the acid from the solvent.

9. A process for obtaining propionic acid in concentrated or anhydrous form from its aqueous solutions, which comprises treating such solutions with amyl propionate as a solvent to extract the propionic acid from the solution, then distilling the resulting extract in the presence of ethyl propionate as a water-entraining liquid for dehydration of the extract, and thereafter distilling the dehydrated extract in the presence of an essence of petroleum as an entraining liquid to remove the propionic acid from the solvent.

10. A process for obtaining formic acid in concentrated or anhydrous form from its aqueous solutions, which comprises treating such solutions with amyl formate as a solvent to extract the formic acid from the solution, then distilling the resulting extract in the presence of propyl formate as a water-entraining liquid for dehydration of the extract, and thereafter distilling the dehydrated extract so as to remove the acid from the solvent.

11. A process for obtaining formic acid in concentrated or anhydrous form from its aqueous solutions, which comprises treating such solutions with amyl formate as a solvent to extract the formic acid from the solution, then distilling the resulting extract in the presence of propyl formate as a water-entraining liquid for dehydration of the extract, and thereafter distilling the dehydrated extract in the presence of normal heptane as an entraining liquid to remove the formic acid from the solvent.

In testimony whereof we have signed this specification.

ELOI RICARD.
HENRI MARTIN GUINOT.